(12) United States Patent
Togo

(10) Patent No.: US 7,076,745 B2
(45) Date of Patent: Jul. 11, 2006

(54) SEMICONDUCTOR INTEGRATED CIRCUIT DEVICE

(75) Inventor: Kiyotake Togo, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 308 days.

(21) Appl. No.: 10/779,650

(22) Filed: Feb. 18, 2004

(65) Prior Publication Data

US 2005/0102446 A1    May 12, 2005

(30) Foreign Application Priority Data

Nov. 12, 2003    (JP)    ............................. 2003-382212

(51) Int. Cl.
G06F 17/50    (2006.01)
G06F 12/00    (2006.01)
(52) U.S. Cl. .................. 716/1; 716/6; 716/10; 711/100
(58) Field of Classification Search .................... 716/1, 716/6, 10; 711/100.105, 111, 147, 168; 710/23; 365/63, 194; 713/401
See application file for complete search history.

(56) References Cited

U.S. PATENT DOCUMENTS

| 6,226,724 | B1* | 5/2001 | Biggs ......................... 711/170 |
| 6,275,914 | B1* | 8/2001 | Jeddeloh ..................... 711/158 |
| 6,292,903 | B1* | 9/2001 | Coteus et al. ................ 713/401 |
| 6,434,034 | B1* | 8/2002 | Wallace et al. ................ 365/52 |
| 6,957,399 | B1* | 10/2005 | Emberling et al. ............. 716/1 |
| 2002/0087821 | A1* | 7/2002 | Saulsbury et al. .......... 711/170 |
| 2004/0107324 | A1* | 6/2004 | Nystuen ..................... 711/105 |

FOREIGN PATENT DOCUMENTS

JP    2001-168201    6/2001

* cited by examiner

Primary Examiner—Paul Dinh
(74) Attorney, Agent, or Firm—Nixon Peabody LLP; Donald R. Studebaker

(57) ABSTRACT

The present invention provides a semiconductor integrated circuit device easy to design timing to be provided with respect to an external memory. In the semiconductor integrated circuit device (10), a second memory controller (16) is provided outside a hard macro (12) containing a first memory controller (15). The length of a wiring (second wiring) between the second memory controller (16) and an IO pad unit (13) is set shorter than the length of a wiring (first wiring) between the first memory controller (15) and the IO pad unit (13). Further, a wiring (40) is provided which transmits a switch signal for exclusively switching the states of the first memory controller (15) and the second memory controller (16) to either one of valid and invalid states.

8 Claims, 6 Drawing Sheets

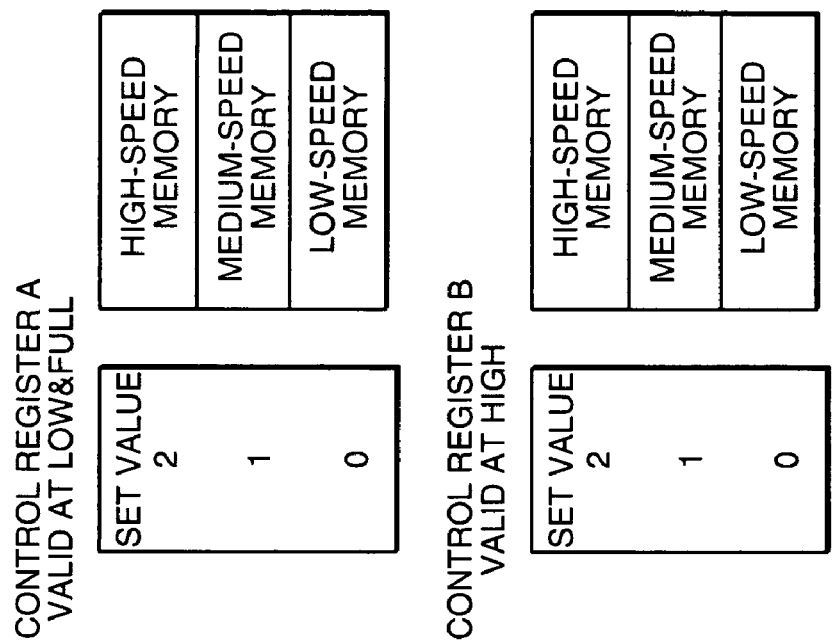
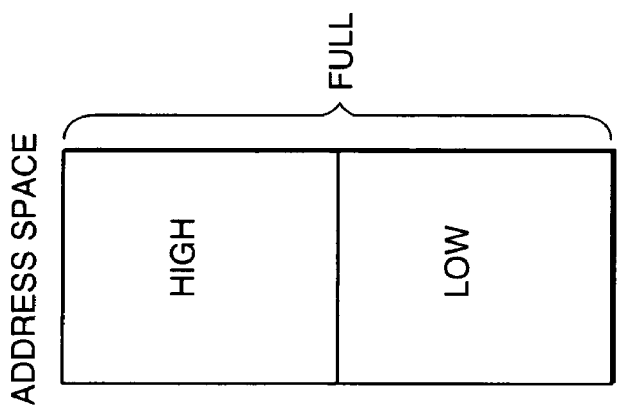

SEMICONDUCTOR INTEGRATED CIRCUIT DEVICE

BACKGROUND OF THE INVENTION

1. Field of the Invention

The present invention relates to a semiconductor integrated circuit device such as an LSI, and particularly to a semiconductor integrated circuit device equipped with a hard macro containing a memory controller.

2. Description of the Related Art

This application is counterpart of Japanese patent application, Serial Number 382212/2003, filed Nov. 12, 2003, the subject matter of which is incorporated herein by reference.

A semiconductor integrated circuit device such as an LSI normally comprises a plurality of functional blocks. Of these functional blocks, the functional blocks high in general versatility are generally libraried in functional block units so that they can be used in various applications. The functional blocks libraried in this manner are called hard macros. As to the hard macro, its placement on the LSI is limited by the size (large-scaled one in particular) and shape (aspect ratio).

FIG. 6 is a configurational diagram of a conventional LSI provided with a hard macro containing a memory controller for controlling (effecting reading/writing on) an external memory.

As shown in the figure, the LSI 100 is provided with a hard macro 120 and an IO pad unit 130. A CPU 140 and a memory controller 150 are placed in the hard macro 120 and interconnected with each other by a system bus 170.

Wirings such as a control bus, an address bus, etc. are provided between the memory controller 150 and the IO pad unit 130 and between the IO pad unit 130 and an external memory 110, and signals or data are transmitted through the wirings. Described specifically, a control signal is transmitted from the memory controller 150 to the memory 110 via the control buses 160 and 180, and address information is transmitted from the memory controller 150 to the memory 110 via the address buses 162, 182. Also output data is transmitted from the memory controller 150 to the memory 110 through the output data bus 164 and the data bus 184, and input data is transmitted from the memory 110 to the memory controller 150 through the data bus 184 and the input data bus 166.

Incidentally, the conventional semiconductor integrated circuit device using the hard macro has been disclosed in various documents (refer to a patent document 1, for example).

Patent Document 1

Japanese Laid Open Patent No. 2001-168201 (see FIG. 3, paragraphs 0051~0056).

When the hard macro is laid out at a position away from the IO pad unit in the configuration of the conventional LSI, the wiring between the memory controller and the IO pad unit becomes long. Therefore, a delay in signal increases and timing design between the memory controller and the external memory might fall into difficulties (be critical). Thus, when the timing to be provided for the external memory is critical, the hard macro may preferably be disposed near the IO pad unit. Since, however, the placement of the hard macro on the LSI is limited by the size and shape as described above, there might be no other choice but to lay out the hard macro at the position away from the IO pad unit. In such a case, the design of the timing to be provided for the external memory falls into difficulties.

A technique for facilitating the design of the timing to be provided for the external memory is not disclosed at all even in Japanese Unexamined Patent Publication No. 2001-168201 referred to above.

SUMMARY OF THE INVENTION

The present invention has been proposed to solve the foregoing problems. Therefore, an object of the present invention is to provide a semiconductor integrated circuit device which makes it easy to design timing to be provided for an external memory.

According to one aspect of the present invention, for achieving the above object, there is provided a semiconductor integrated circuit device comprising a hard macro containing a first memory controller that controls the input/output from and to an external memory, a second memory controller that is provided outside the hard macro and controls the input/output from and to the external memory, an IO pad unit provided outside the hard macro as an electrical interface to the outside, a first wiring that connects the first memory controller and the IO pad unit, and a second wiring that connects the second memory controller and the IO pad unit and has a length shorter than the length of the first wiring.

That is, the second memory controller is provided outside the hard macro containing the first memory controller. The length of the second wiring for connecting the second memory controller and the IO pad unit is set shorter than the length of the first wiring for connecting the first memory controller and the IO pad unit.

Thus, the second memory controller located such that the length of the wiring between the second memory controller and the IO pad unit becomes relatively short, is capable of controlling the external memory and facilitating the design of timing to be provided for the external memory, as an alternative to the first memory controller which is located such that the length of the wiring between the first memory controller and the IO pad unit is relatively long and which is relatively difficult to make the design of timing to be provided for the external memory.

In the semiconductor integrated circuit device, the hard macro can further include a CPU. That is, the hard macro can take such a configuration as to control the entire semiconductor integrated circuit device.

The semiconductor integrated circuit device can further be provided with a third wiring that transmits to the first memory controller and the second memory controller, a signal for exclusively switching the states of the first memory controller and the second memory controller to either one of valid and invalid states.

Thus, the states of the first memory controller and the second memory controller can be exclusively switched to either one of the valid and invalid states with ease.

The semiconductor integrated circuit device can further includes a register that is provided inside the hard macro and stores a code for exclusively switching the states of the first memory controller and the second memory controller to either one of valid and invalid states, and a third wiring that transmits the code stored in the register to the first memory controller and the second memory controller.

Thus, the states of the first memory controller and the second memory controller can be exclusively switched to either one of the valid and invalid states with ease. Owing to the provision of the register, there is no need to provide an externally-inputted signal for switching the states of the first memory controller and the second memory controller.

The semiconductor integrated circuit device can also further be provided with at least a pair of third wirings that transmits signals for switching the settings of the first memory controller and the second memory controller to the first memory controller and the second memory controller.

Incidentally, the external memory exists in plural form and the settings can be defined as settings for determining an external memory to be controlled, of the plurality of external memories.

Furthermore, the settings can also further include settings related to an address space of the external memory determined as an object to be controlled.

Thus, the settings of the first memory controller and the second memory controller can be easily switched and a plurality of types of external memories can be controlled. Incidentally, the settings can include settings such as the types of memories to be controlled for the first and second memory controllers. Thus, the memories suitable for the respective memory controllers can be set as objects to be controlled.

The semiconductor integrated circuit device can further include registers that are provided inside the hard macro and store codes for respectively switching the settings of the first memory controller and the second memory controller, and at least a pair of third wirings for transmitting the codes stored in the registers to the first memory controller and the second memory controller.

Thus, the settings of the first memory controller and the second memory controller can be easily switched and a plurality of types of external memories can be controlled. Further, externally-inputted signals for switching the settings of the first memory controller and the second memory controller become unnecessary owing to the provision of the registers.

According to the present invention as described above, the second memory controller is provided outside the hard macro including the first memory controller, and the wiring between the second memory controller and the IO pad unit is set shorter than the wiring between the first memory controller and the IO pad unit. Therefore, an advantageous effect is brought about that a delay in signal between each memory controller and the external memory can be reduced and the design of timing to be provided for the external memory can be facilitated.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4(A) is a diagram showing the relationship of correspondence between switch signals and an accessible address space, and FIG. 4(B) is a diagram illustrating specific examples of set values in two control registers (control register A and control register B) for setting a first memory controller;

DETAILED DESCRIPTION OF THE INVENTION

Preferred embodiments of the present invention will hereinafter be described in detail with reference to the accompanying drawings.

First Embodiment

Figure 1:
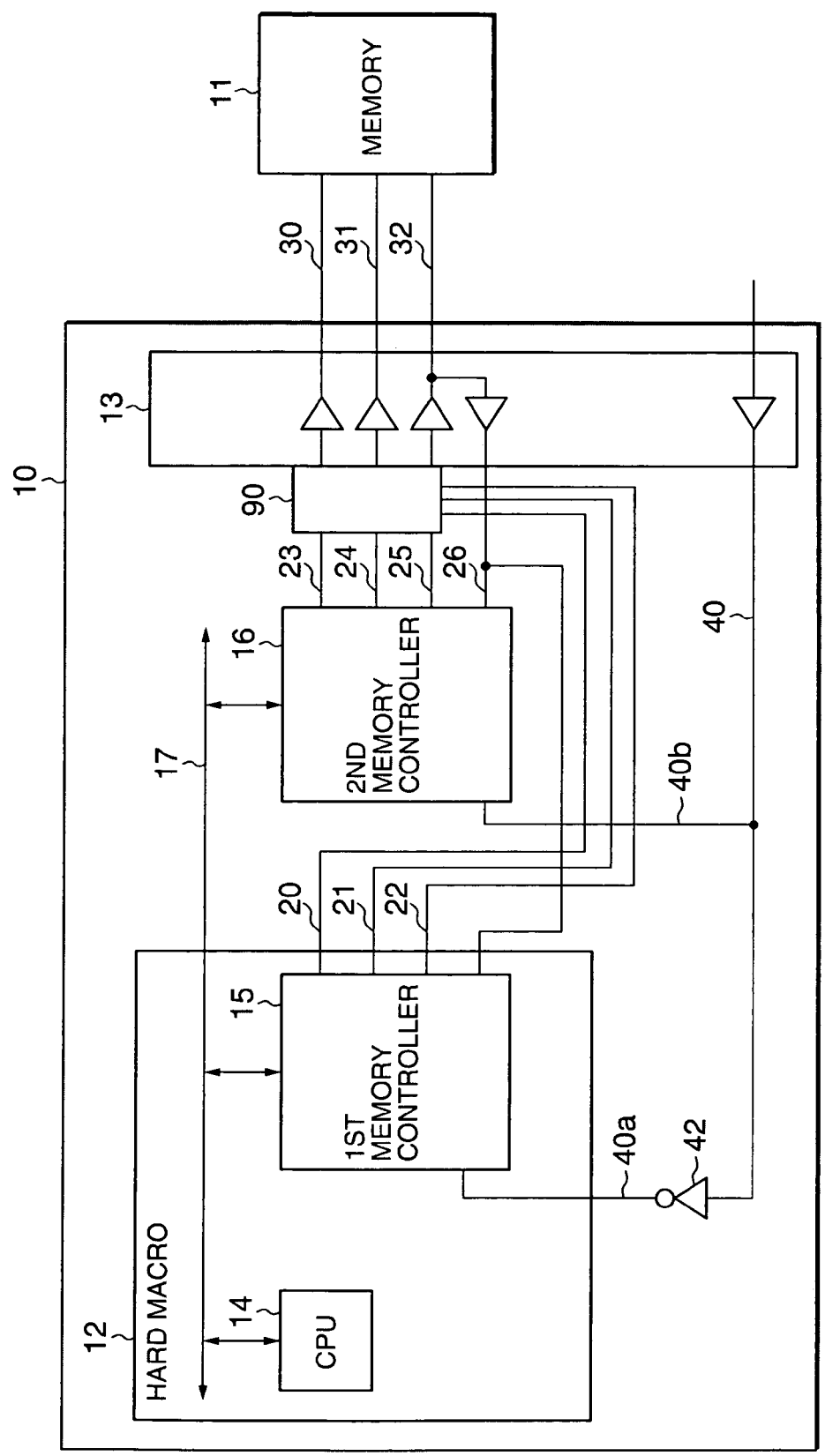
FIG. 1 is a schematic configurational diagram of a semiconductor integrated circuit device according to a first embodiment of the present invention.

FIG. 1 is a schematic configurational diagram of a semiconductor integrated circuit device 10 according to a first embodiment of the present invention.

As shown in the figure, the semiconductor integrated circuit device 10 is provided with a hard macro 12. The hard macro 12 is provided with a CPU 14 and a first memory controller 15. The CPU 14 and the first memory controller 15 are interconnected with each other by a system bus 17. The first memory controller 15 controls the input/output of data to/from a memory 11 provided outside the semiconductor integrated circuit device 10.

The semiconductor integrated circuit device 10 is further equipped with a second memory controller 16, an IO pad unit 13 and an OR circuit unit 90. The second memory controller 16 has a function similar to the first memory controller 15 and is disposed between the hard macro 12 and the IO pad unit 13. The second memory controller 16 is interconnected with the CPU 14 through the system bus 17 in a manner similar to the first memory controller 15. The IO pad unit 13 is provided as an electrical interface to the outside of the semiconductor integrated circuit device 10. Each of the first memory controller 15 and the second memory controller 16, and the memory 11 are connected to one another by connecting terminals of the IO pad unit 13.

Three buses, i.e., a control bus 30, an address bus 31 and a data bus 32 are provided between the IO pad unit 13 and the memory 11.

Four buses (control bus 20, address bus 21, output data bus 22 and input data bus 26) used as a first wiring are provided between the first memory controller 15 and the IO pad unit 13. Incidentally, the input data bus 26 is branched to two lines midway through a wiring, one of which is connected to the first memory controller 15 and the other of which is connected to the second memory controller 16.

Four buses (control bus 23, address bus 24, output data bus 25 and input data bus 26 shared with the first memory controller 15) used as a second wiring are provided between the second memory controller 16 and the IO pad unit 13. As is apparent from the drawing, the length of the second wiring is shorter than that of the first wiring.

Incidentally, the control buses 20, 23 and 30 transmit control signals, and the address buses 21, 24 and 31 transmit address information. The output data buses 22 and 25 transmit output data and the input data bus 26 transmits input data. The data bus 32 transmits input data and output data.

The OR circuit unit 90 is provided in connection with the IO pad unit 13. The OR circuit unit 90 is made up of three OR circuits (not shown). Ones of respective two input terminals provided in the respective OR circuits are respectively connected to the control bus 20, address bus 21 and output data bus 22 of the first wiring, and the others thereof are respectively connected to the control bus 23, address bus 24 and output data bus 25 of the second wiring. When either one of the two input terminals is inputted with a signal or data, each of the OR circuits outputs the input signal or data to the IO pad unit 13 through an output terminal of the OR circuit.

Further, the semiconductor integrated circuit device 10 is provided with a wiring 40 for transmitting a switch signal for exclusively switching the states of the first memory controller 15 and the second memory controller 16 to either one of valid and invalid states. An input end of the wiring 40 is connected to its corresponding connecting terminal of the IO pad unit 13 and inputs the switch signal from outside. Further, the wiring 40 is branched to two lines (wirings 40a and 40b) midway through the wiring. An output end of one wiring 40a is connected to the first memory controller 15 and an output end of the other wiring 40b is connected to the second memory controller 16. Incidentally, an inverter circuit 42 is provided at the wiring 40a and transmits the switch signal to the first memory controller 15 in an ever-inverted state. Thus, one switch signal enables exclusive switching of the states of the first memory controller 15 and the second memory controller 16.

The operation of the present semiconductor integrated circuit device 10 will now be explained. When the switch signal inputted to the wiring 40 is of an H level, the switch signal is inverted to an L level by the inverter circuit 42, which in turn is transmitted to the first memory controller 15. The switch signal of the H level is transmitted to the second memory controller 16 as it is.

The first memory controller 15 inputted with the switch signal of the L level becomes ineffective and the second memory controller 16 inputted with the switch signal of the H level becomes effective. Thus, the second memory controller 16 controls the memory 11 instead of the first memory controller 15.

Incidentally, the valid/invalid states of the two memory controllers may be switched to states opposite to the above with the switch signal inputted to the wiring 40 as the L level.

In the semiconductor integrated circuit device 10 according to the present embodiment as described above, the second memory controller 16 is provided outside the hard macro 12 containing the first memory controller 15, the length of the wiring (second wiring) between the second memory controller 16 and the IO pad unit 13 is set shorter than the length of the wiring (first wiring) between the first memory controller 15 and the IO pad unit 13, and the wiring 40 is provided which transmits the switch signal for exclusively switching the states of the first memory controller 15 and the second memory controller 16 to either one of the valid and invalid states. Therefore, the second memory controller 16 located such that the length of the wiring between the second memory controller 16 and the IO pad unit 13 becomes relatively short, is capable of controlling the external memory 11 and facilitating the design of timing to be provided for the external memory 11 instead of the first memory controller 15 which is located such that the length of the wiring between the first memory controller 15 and the IO pad unit 13 is relatively long and which is relatively hard to make the design of timing to be provided for or with respect to the external memory 11.

Second Embodiment

While the first embodiment has explained the example in which the semiconductor integrated circuit device 10 is provided with the wiring 40 for transmitting the switch signal and the states of the first memory controller 15 and the second memory controller 16 are exclusively switched to either one of the valid and invalid states according to the switch signal inputted from outside, the present embodiment will explain an example in which a register is provided inside a hard macro 12 instead of the wiring 40 and the states of a first memory controller 15 and a second memory controller 16 are switched according to the value of the register. Incidentally, components employed in the present embodiment, which are similar to those employed in the first embodiment, are respectively identified by the same reference numerals, and the description thereof will therefore be omitted.

Figure 2:
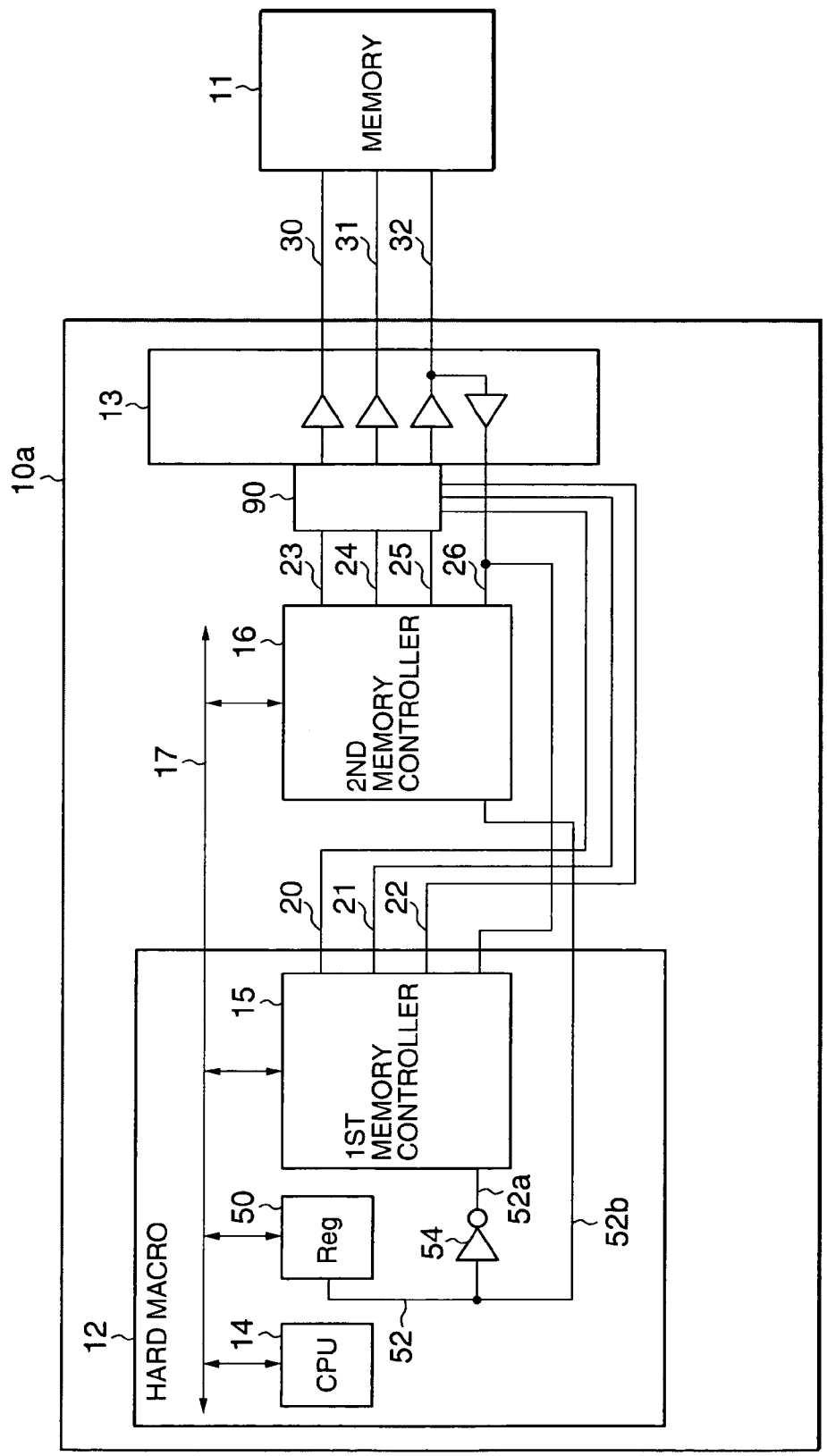
FIG. 2 is a schematic configurational diagram of a semiconductor integrated circuit device according to a second embodiment of the present invention.

FIG. 2 is a schematic configurational diagram of a semiconductor integrated circuit device 10a according to the present embodiment. In a manner similar to the first embodiment, the second memory controller 16 is provided outside the hard macro 12 including the first memory controller 15, and the length of a wiring between the second memory controller 16 and an IO pad unit 13 is set so as to be shorter than the length of a wiring between the first memory controller 15 and the IO pad unit 13.

In the present embodiment, the register 50 is provided within the hard macro 12 as an alternative to the wiring 40 employed in the first embodiment. A code for exclusively switching the states of the first memory controller 15 and the second memory controller 16 to either one of valid and invalid states is stored in the register 50. Further, a wiring 52 for transmitting the code is provided between the register 50 and both the first memory controller 15 and the second memory controller 16.

An input end of the wiring 52 is connected to the register 50 and inputs a code from the register 50. The wiring 52 is branched to two lines (wirings 52a and 52b) midway through the wiring. An output end of one wiring 52a is connected to the first memory controller 15 and an output end of the other wiring 52b is connected to the second memory controller 16. Incidentally, an inverter circuit 54 is provided at the wiring 52a and transmits the code of the register 50 to the first memory controller 15 in an ever-inverted state. Thus, one code stored in the register 50 enables exclusive switching of the states of the first memory controller 15 and the second memory controller 16.

The operation of the present semiconductor integrated circuit device 10a will now be explained. When the code of the register 50 is set to an H level, the code of the register 50 is inverted to an L level by the inverter circuit 54, which in turn is transmitted to the first memory controller 15. The code (H level) of the register 50 is transmitted to the second memory controller 16 as it is.

The first memory controller 15 inputted with the code of the L level becomes ineffective and the second memory controller 16 inputted with the code of the H level becomes effective. Thus, the second memory controller 16 controls the memory 11 instead of the first memory controller 15.

Incidentally, the valid/invalid states of the two memory controllers may be switched to states opposite to the above with the code of the register 50 as the L level.

In the semiconductor integrated circuit device 10a according to the present embodiment as described above, the second memory controller 16 is provided outside the hard macro 12 containing the first memory controller 15, the length of the wiring (second wiring) between the second memory controller 16 and the IO pad unit 13 is set shorter than the length of the wiring (first wiring) between the first memory controller 15 and the IO pad unit 13. Further, there are provided the register 50 which stores the code for exclusively switching the states of the first memory controller 15 and the second memory controller 16 to either one of the valid and invalid states, and the wiring 52 for transmitting the code stored in the register 50. Therefore, the second memory controller 16 located such that the length of the wiring between the second memory controller 16 and the IO pad unit 13 becomes relatively short, is capable of controlling the external memory 11 and facilitating the design of timing to be provided for the external memory 11 as an alternative to the first memory controller 15 which is located such that the length of the wiring between the first memory controller 15 and the IO pad unit 13 is relatively long and which is relatively hard to make the design of timing to be provided for the external memory 11.

Further, although the first embodiment needed the switch signal inputted from the outside of the semiconductor integrated circuit device, the present embodiment makes the switch signal unnecessary.

Third Embodiment

While the first and second embodiments respectively have explained the example in which the states of the first memory controller 15 and the second memory controller 16 are exclusively switched to either one of the valid and invalid states, the present embodiment will explain an example in which the settings of a first memory controller 15 and a second memory controller 16 are switched to control a plurality of types of memories. Incidentally, components employed in the present embodiment, which are similar to those employed in the first embodiment, are respectively identified by the same reference numerals, and the description thereof will therefore be omitted.

Figure 3:
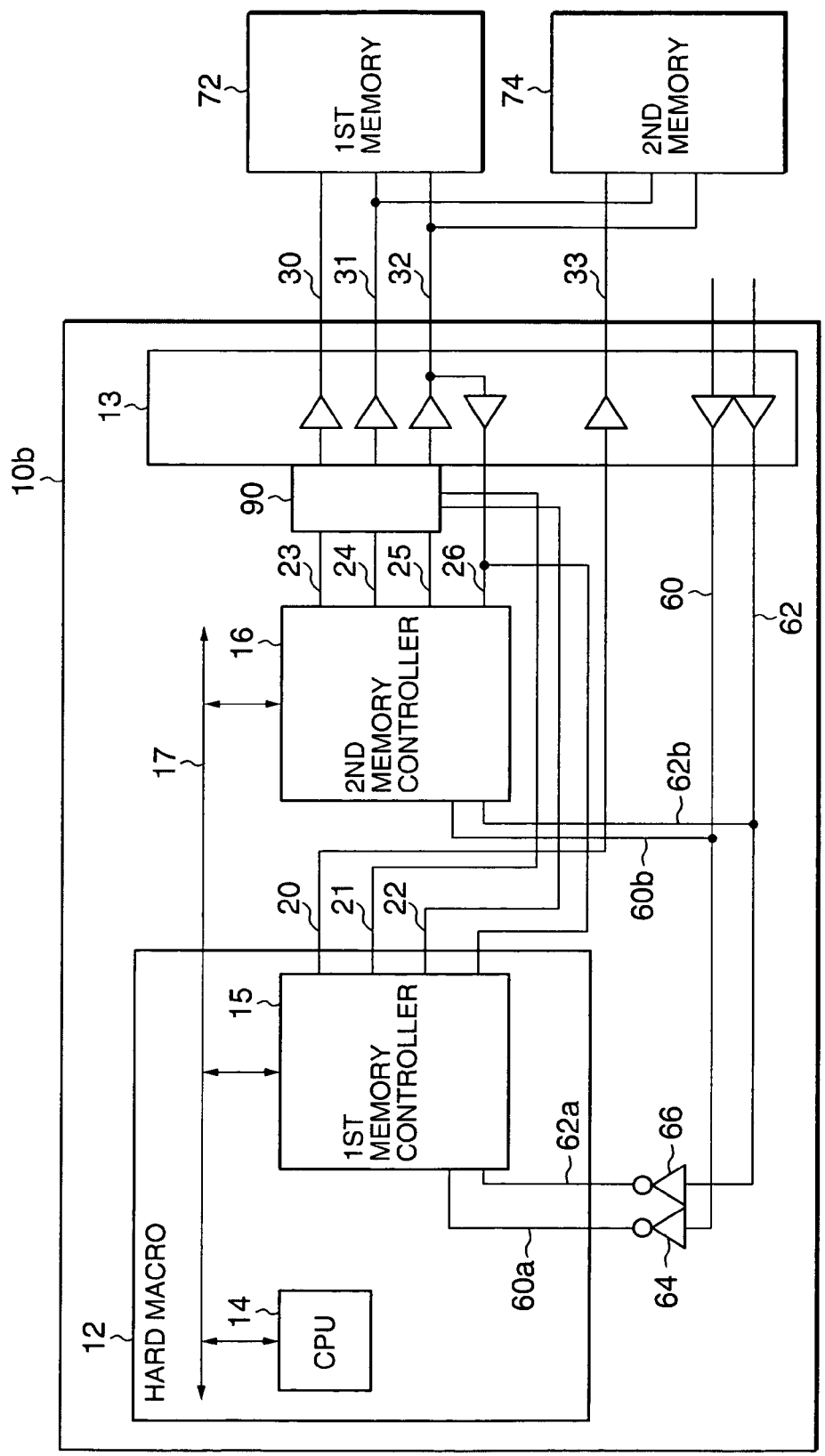
FIG. 3 is a schematic configurational diagram of a semiconductor integrated circuit device according to a third embodiment of the present invention.

FIG. 3 is a schematic configurational diagram of a semiconductor integrated circuit device 10b according to the present embodiment. The present embodiment is similar to the first embodiment in that as shown in the figure, the second memory controller 16 is provided outside a hard macro 12 containing the first memory controller 15, and the length of a wiring between the second memory controller 16 and an IO pad unit 13 is set shorter than the length of a wiring between the first memory controller 15 and the IO pad unit 13. Portions different from the first embodiment will be explained below.

In the present embodiment, an output end of a control bus 20 between the first memory controller 15 and the IO pad unit 13 and an output end of a control bus 23 between the second memory controller 16 and the IO pad unit 13 are directly connected to the IO pad unit 13 without via an OR circuit unit 90. The two memory controllers are capable of controlling different memories independently.

In the present embodiment, the first memory controller 15 and the second memory controller 16 are used to control two types of memories (first memory 72 and second memory 74) provided outside the semiconductor integrated circuit device 10b. Here, the first memory 72 is a high-speed memory and the second memory 74 is a low-speed memory. As to wirings lying between both the first memory 72 and the second memory 74 and the IO pad unit 13 of the semiconductor integrated circuit device. 10b, an address bus 31 and a data bus 32 are shared between the first memory 72 and the second memory 74 and are respectively branched to two lines midway through the wirings, which in turn are connected to the first memory 72 and the second memory 74 respectively.

Two control buses 30 and 33 are arranged corresponding to the first memory 72 and the second memory 74. The control bus 30 on the first memory 72 side is connected to the control bus 23 on the second memory controller 16 side through the IO pad unit 13. The control bus 33 on the second memory 47 side is connected to the control bus 20 on the first memory controller 15 side through the IO pad unit 13.

Further, the semiconductor integrated circuit device 10b is provided with two wirings 60 and 62 which transmit switch signals for respectively switching the settings of the first memory controller 15 and the second memory controller 16. Input ends of the two wirings 60 and 62 are connected to their corresponding connecting terminals of the IO pad unit 13 and input the switch signals from outside. Further, the wirings 60 and 62 are respectively branched to two lines (wirings 60a and 60b, and 62a and 62b) midway through the wirings. Output ends of the wirings 60a and 62a are connected to the first memory controller 15, whereas output ends of the wirings 60b and 62b are connected to the second memory controller 16. Incidentally, inverter circuits 64 and 66 are provided at the wirings 60a and 62a and transmit the switch signals to the first memory controller 15 in ever-inverted states respectively. Thus, it is possible to exclusively switch the settings of the first memory controller 15 and the second memory controller 16.

The operation of switching the setting of the first memory controller 15 of the present semiconductor integrated circuit device 10b will now be explained with reference to FIG. 4.

FIG. 4(A) is a diagram showing the relationship of correspondence between switch signals and an accessible address space. In the figure, four sections of Disable (inaccessible), Low, High and Full (Low and High) are defined. FIG. 4(B) shows specific examples of set values in two control registers (control register A and control register B) for setting the first memory controller 15. A memory (any of high-speed memory, medium-speed memory and low-speed memory) to be controlled can be set in accordance with the values of these control registers. Here, the control register A sets the first memory controller 15 when the accessible address space is Low or Full, whereas when the accessible address space is High, the control register B sets the first memory controller 15. In the present embodiment, "1 (medium-speed memory)" and "0 (low-speed memory)" are respectively set to the control register A and the control register B as the memories to be controlled. Incidentally, the control registers for setting the first memory controller 15 are provided in the first memory controller 15.

As one example, a description will be made, with illustration, of a case in which a switch signal inputted to the wiring 60 is an L level and a switch signal inputted to the wiring 62 is an H level. In this case, the switch signal is inverted to an H level by the inverter circuit 64 of the wiring 60a, which in turn is transmitted to the first memory controller 15. The switch signal is inverted to an L level by the inverter circuit 66 of the wiring 62a, which in turn is transmitted to the first memory controller 15.

Thus, when the levels of the signals transmitted through the wirings 60a and 62a are H(1) and L(0), the accessible address space is High as apparent from FIGS. 4(A) and 4(B), and the control register for setting each memory to be controlled is of the control register B. Since the set value of the control register B is "0" here, the memory to be controlled of the first memory controller 15 can be set to the low-speed memory (second memory 74 here).

Similarly, an input end of the wiring 52 is connected to the register 50 and inputs a code from the register 50. The wiring 52 is branched to two lines (wirings 52a and 52b) midway through the wiring. An output end of one wiring 52a is connected to the first memory controller 15 and an output end of the other wiring 52b is connected to the second memory controller 16. Incidentally, an inverter circuit 54 is provided at the wiring 52a and transmits the code of the register 50 to the first memory controller 15 in an ever-inverted state. Thus, one code stored in the register 50 enables exclusive switching of the states of the first memory controller 15 and the second memory controller 16.

Incidentally, the control registers for setting the second memory controller 16 are provided in the second memory controller 16 in a manner similar to the first memory controller 15.

Incidentally, when the levels of the input signals are L(0) and L(0), the accessible address space is Disable, thus resulting in invalidity (inability to access). Since, at this time, the levels of the signals inputted to other memory controller are H(1) and H(1), the accessible address space is brought to Full so that control on the corresponding memory set to the control register corresponding to it is enabled.

In the semiconductor integrated circuit device 10b according to the present embodiment as described above, the second memory controller 16 is provided outside the hard macro 12 containing the first memory controller 15, the length of the wiring (second wiring) between the second memory controller 16 and the IO pad unit 13 is set shorter than the length of the wiring (first wiring) between the first memory controller 15 and the IO pad unit 13. Further, there is provided the wirings which transmit the switch signals for respectively switching the settings of the first memory controller 15 and the second memory controller 16. Therefore, the second memory controller 16 located such that the length of the wiring between the second memory controller 16 and the IO pad unit 13 becomes relatively short, is capable of controlling the external high-speed memory and facilitating the design of timing to be provided for the external memory as an alternative to the first memory controller 15 which is located such that the length of the wiring between the first memory controller 15 and the IO pad unit 13 is relatively long and which is relatively difficult to make the design of timing to be provided for the external memory.

Further, while the controllable memory is one kind alone in the first embodiment, the present embodiment is capable of controlling another type of memory (e.g., low-speed or medium-speed memory) while simultaneously using the first memory controller 15 difficult in timing design.

Incidentally, although the present embodiment has explained the example in which the set values of the control registers A and B respectively correspond to the medium-speed memory and the low-speed memory, the present invention is not limited to it. For instance, either one of the set values may be associated with the high-speed memory.

Fourth Embodiment

While the third embodiment has explained the example in which the semiconductor integrated circuit device 10b is provided with the wirings 60 and 62 for transmitting the switch signals to thereby switch the settings of the first memory controller 15 and the second memory controller 16 in accordance with the switch signals inputted from outside, the present embodiment will explain an example in which registers are provided inside a hard macro 12 as an alternative to the wirings 60 and 62, and the settings of a first memory controller 15 and a second memory controller 16 are switched according to the values of the registers. Incidentally, components employed in the present embodiment, which are similar to those employed in the third embodiment, are respectively identified by the same reference numerals, and the description thereof will therefore be omitted.

Figure 5:
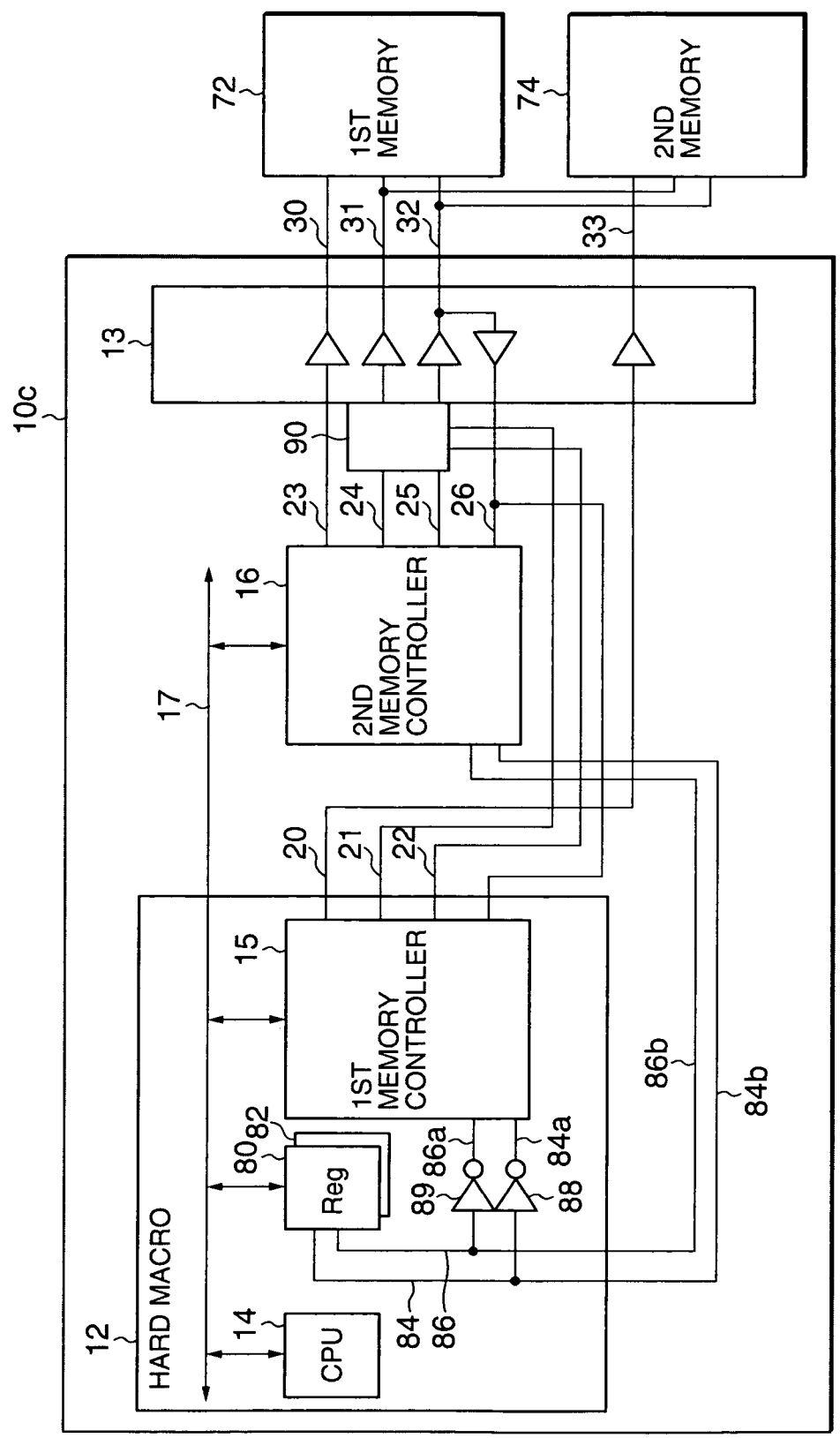
FIG. 5 is a schematic configurational diagram of a semiconductor integrated circuit device according to a fourth embodiment of the present invention.
Figure 6:
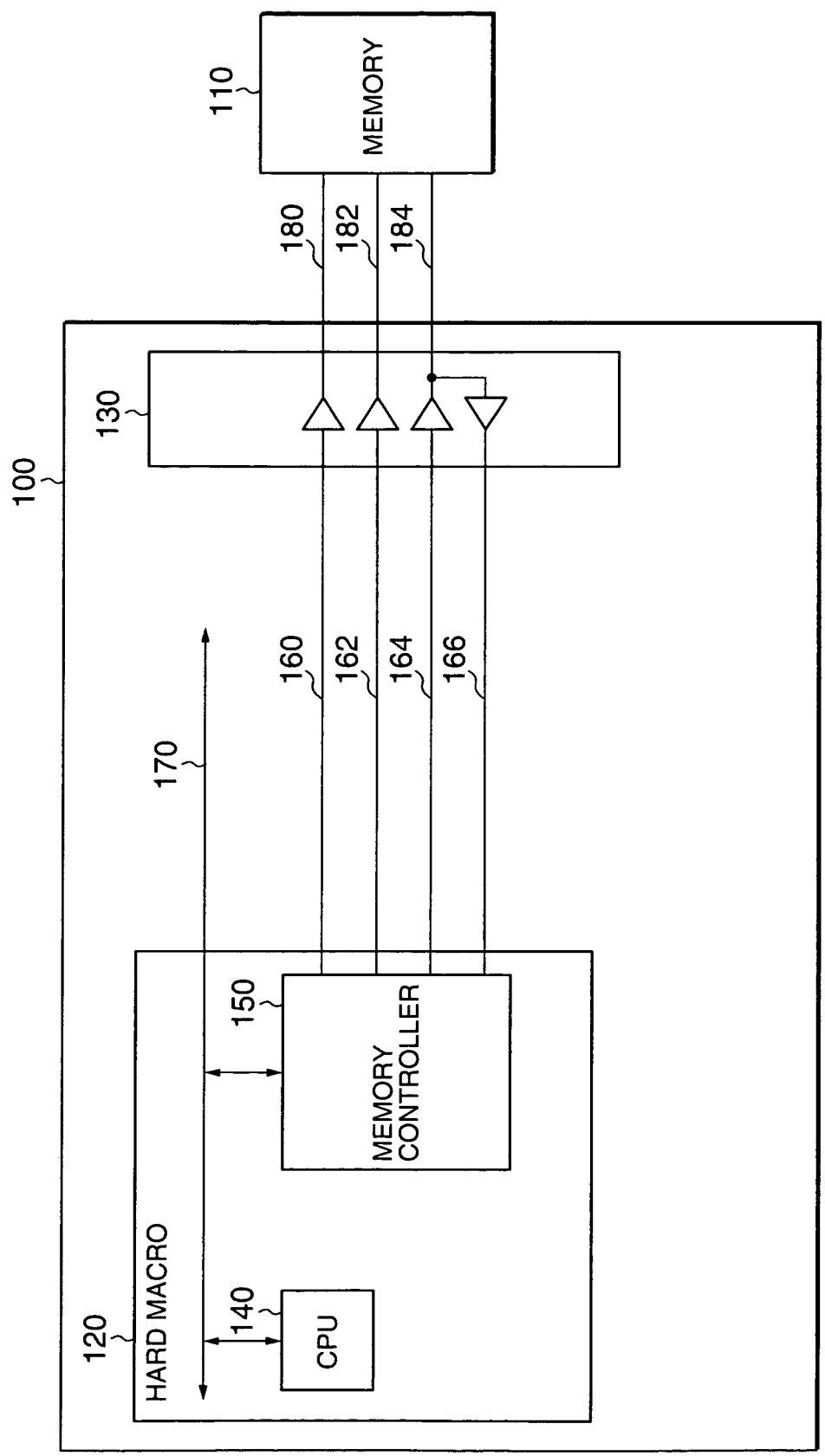
FIG. 6 is a schematic configurational diagram of a conventional semiconductor integrated circuit device.

FIG. 5 is a schematic configurational diagram of a semiconductor integrated circuit device 10c according to the present embodiment. As shown in the figure, two registers 80 and 82 are provided within a hard macro 12 as an alternative to the two wirings employed in the third embodiment. Codes for switching the settings of the first memory controller 15 and the second memory controller 16 are stored in the registers 80 and 82. Further, wirings 84 and 86 for transmitting the codes stored in the registers 80 and 82 are provided between the registers 80 and 82 and both the first memory controller 15 and the second memory controller 16.

Input ends of the wirings 84 and 86 are connected to their corresponding registers 80 and 82 and input codes from the registers 80 and 82. The wirings 84 and 86 are respectively branched to two lines (wirings 84a and 84b, and 86a and 86b) midway through the wirings. Output ends of the wiring 84a and 86a are connected to the first memory controller 15, whereas output ends of the wirings 84b and 86b are connected to the second memory controller 16. Incidentally, inverter circuits 88 and 89 are provided at the wirings 84a and 86a and transmit the codes of the registers 80 and 82 to the first memory controller 15 in ever-inverted states. Thus, the states of the first memory controller 15 and the second memory controller 16 can be exclusively switched.

The operation of switching the setting of the first memory controller 15 of the present semiconductor integrated circuit device 10c will now be described. When the code of the register 80 is set to an L level and the code of the register 82 is set to an H level, the code of the register 80 is inverted to an H level by the inverter circuit 88 of the wiring 84a, followed by being transmitted to the first memory controller 15. The code of the register 82 is inverted to an L level by the inverter circuit 89 of the wiring 86a, followed by being transmitted to the first memory controller 15.

Thus, when the levels of the signals outputted through the wirings 84a and 86a are H(1) and L(0), the settings are switched in a manner similar to the third embodiment. Even in the present embodiment, for example, the settings can be changed as shown in FIGS. 4(A) and 4(B), the accessible address space can be set High, and a control register for setting a memory to be controlled can be set as a control register B. If, at this time, the set value of the control register B is set as "0", then the memory to be controlled of the first memory controller 15 can be set to a low-speed memory (second memory 74 here).

Similarly, the second memory controller 16 is also capable of switching settings by the levels (L and H in the present embodiment) of the signals outputted through the wirings 84b and 86b. For instance, the memory to be controlled can be set to a high-speed memory (first memory 72). Thus, the second memory controller 16 short in wiring length is capable of controlling a relatively high-speed memory difficulty in timing design and thereby facilitating the timing design.

In the semiconductor integrated circuit device 10c according to the present embodiment as described above, the second memory controller 16 is provided outside the hard macro 12 containing the first memory controller 15, the length of the wiring (second wiring) between the second memory controller 16 and the IO pad unit 13 is set shorter than the length of the wiring (first wiring) between the first memory controller 15 and the IO pad unit 13. Further, there is provided the registers 80 and 82 which store the codes for respectively switching the settings of the first memory controller 15 and the second memory controller 16. Therefore, the second memory controller 16 located such that the length of the wiring between the second memory controller 16 and the IO pad unit 13 becomes relatively short, is capable of controlling the external high-speed memory and facilitating the design of timing to be provided for the external memory as an alternative to the first memory controller 15 which is located such that the length of the wiring between the first memory controller 15 and the IO pad unit 13 is relatively long and which is relatively difficult to make the design of timing to be provided for the external memory.

Further, while the controllable memory is one kind alone in the first embodiment, the present embodiment is also capable of controlling another type of memory (e.g., low-speed or medium-speed memory) while simultaneously using the first memory controller 15 difficult in timing design, in a manner similar to the third embodiment.

Although the, third embodiment needed the switch signals inputted from the outside of the semiconductor integrated circuit device, the present embodiment makes the switch signals unnecessary.

Although the various embodiments have been described above, the present invention is not limited to the semiconductor integrated circuit devices described in the first through fourth embodiments by way of illustration. The present invention is applicable to various semiconductor integrated circuit devices.

What is claimed is:

1. A semiconductor integrated circuit device comprising:
   a hard macro containing a first memory controller that controls the input/output from and to an external memory;
   a second memory controller that is provided outside the hard macro and controls the input/output from and to the external memory;
   an IO pad unit provided outside the hard macro as an electrical interface to the outside;
   a first wiring that connects the first memory controller and the IO pad unit; and
   a second wiring that connects the second memory controller and the IO pad unit and has a length shorter than the length of the first wiring.

2. A semiconductor integrated circuit device according to claim 1, wherein the hard macro further includes a CPU.

3. A semiconductor integrated circuit device according to claim 1, further comprising a third wiring that transmits to the first memory controller and the second memory controller, an externally-inputted signal for exclusively switching the states of the first memory controller and the second memory controller to either one of valid and invalid states.

4. A semiconductor integrated circuit device according to claim 1, further comprising:
   a register that is provided inside the hard macro and stores a code for exclusively switching the states of the first memory controller and the second memory controller to either one of valid and invalid states; and
   a third wiring that transmits the code stored in the register to the first memory controller and the second memory controller.

5. A semiconductor integrated circuit device according to claim 1, further comprising at least a pair of third wirings that transmits signals for switching the settings of the first memory controller and the second memory controller to the first memory controller and the second memory controller.

6. A semiconductor integrated circuit device according to claim 1, further comprising:
   registers that are provided inside the hard macro and store codes for respectively switching the settings of the first memory controller and the second memory controller, and
   at least a pair of third wirings for transmitting the codes stored in the registers to the first memory controller and the second memory controller.

7. A semiconductor integrated circuit device according to claim 5, wherein the external memory exists in plural form and the settings are settings for determining an external memory to be controlled, of the plurality of external memories.

8. A semiconductor integrated circuit device according to claim 7, wherein the settings further include settings related to an address space of the external memory determined as an object to be controlled.

* * * * *